United States Patent
Ko (10) Patent No.: US 9,568,732 B2
(45) Date of Patent: Feb. 14, 2017

(54) MOBILE TERMINAL

(71) Applicant: LG ELECTRONICS INC., Seoul (KR)

(72) Inventor: Dongseuck Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 14/457,427

(22) Filed: Aug. 12, 2014

(65) Prior Publication Data

US 2015/0219898 A1  Aug. 6, 2015

(30) Foreign Application Priority Data

Feb. 4, 2014  (KR) ........................ 10-2014-0012705

(51) Int. Cl.
*G02B 27/14* (2006.01)
*G02B 27/01* (2006.01)

(52) U.S. Cl.
CPC ....... *G02B 27/0172* (2013.01); *G02B 27/0101* (2013.01); *G02B 2027/013* (2013.01); *G02B 2027/0178* (2013.01)

(58) Field of Classification Search
CPC ............ G02B 27/0172; G02B 27/0101; G02B 27/0118; G02B 27/0123; G02B 27/0178
USPC .................. 359/631, 630, 627, 629, 633
See application file for complete search history.

(56) References Cited

U.S. PATENT DOCUMENTS

| 2002/0051299 A1* | 5/2002 | Togino ............... | G02B 17/0848 359/633 |
| 2002/0070904 A1* | 6/2002 | Okuyama .......... | G02B 27/0172 345/7 |
| 2002/0163734 A1 | 11/2002 | Inoguchi | |
| 2011/0051076 A1* | 3/2011 | Sugihara ............ | G02B 27/0172 351/158 |

OTHER PUBLICATIONS

European Search Report issued in Application No. 14182272.6 dated Apr. 23, 2015.

* cited by examiner

*Primary Examiner* — Bumsuk Won
*Assistant Examiner* — Tamara Y Washington
(74) *Attorney, Agent, or Firm* — Ked & Associates LLP (57) ABSTRACT

A wearable type mobile terminal is provided which may be mounted on a user's head. The wearable type mobile terminal may include a prism disposed in front of a user, and positioned longitudinally, an optical source device that irradiates light to the prism in a direction that is inclined by a prescribed angle with respect to the longitudinal direction, and an asymmetric lens disposed between the prism and the optical source device such that light irradiated from the optical source device is collected toward the prism, and the asymmetric lens is formed such that an optical axis of an incident surface and an optical axis of an exit surface extend in different directions.

20 Claims, 8 Drawing Sheets

MOBILE TERMINAL

CROSS-REFERENCE TO RELATED APPLICATION(S)

This application claims priority under 35 U.S.C. §119 to Korean Application No. 10-2014-0012705, filed in Korea on Feb. 4, 2014, whose entire disclosure is hereby incorporated by reference.

BACKGROUND

1. Field

This relates to a mobile terminal, and particularly, to a wearable mobile terminal.

2. Background

Terminals may be generally classified as mobile/portable terminals or stationary terminals based on a degree of mobility. Mobile terminals may be further classified as handheld terminals, vehicle mounted terminals and the like, based on whether or not the terminal may be directly carried.

Mobile terminals may include functions such as data and voice communications, capturing images and video via a camera, recording audio, playing music files via a speaker system, displaying images and video on a display, and other such functions. Some mobile terminals may also support game playing, and some terminals may be configured as multimedia players. Other such mobile terminals may be configured to receive broadcast and multicast signals which permit viewing of content such as videos and television programs.

BRIEF DESCRIPTION OF THE DRAWINGS

The embodiments will be described in detail with reference to the following drawings in which like reference numerals refer to like elements wherein.

DETAILED DESCRIPTION

Description will now be given in detail according to exemplary embodiments disclosed herein, with reference to the accompanying drawings. For the sake of brief description with reference to the drawings, the same or similar components may be provided with the same or similar reference numbers, and description thereof will not be repeated. In general, a suffix such as "module" or "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are provided to facilitate understanding of various technical features, and it is understood that the exemplary embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals may include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Efforts are ongoing to support and increase the functionality of mobile terminals. Such efforts include may include software and hardware improvements, as well as changes and improvements in various structural components.

In the area structural improvement, in certain embodiments a mobile terminal may be a wearable device which may be mounted on a user's body, in addition to a device intended to be held by a user's hand. Such wearable device may include, for example, a glass-type mobile terminal. As a glass-type mobile terminal may be mounted on a user's head, it may be advantageous to reduce weight of such a glass-type mobile terminal.

In one type of glass-type mobile terminal, a plurality of lenses may be laminated on each other in a line in front of a display. However, arrangement of the plurality of lenses in a line may increase the size of the mobile terminal. In another type of glass-type mobile terminal, light may be incident on a glass from a lateral direction and then reflected in a direction perpendicular to the incident direction. However, in this arrangement, the glass may be relatively thick, corresponding to a thickness of a beam splitter, thus increasing the size of the mobile terminal.

Figure 1:
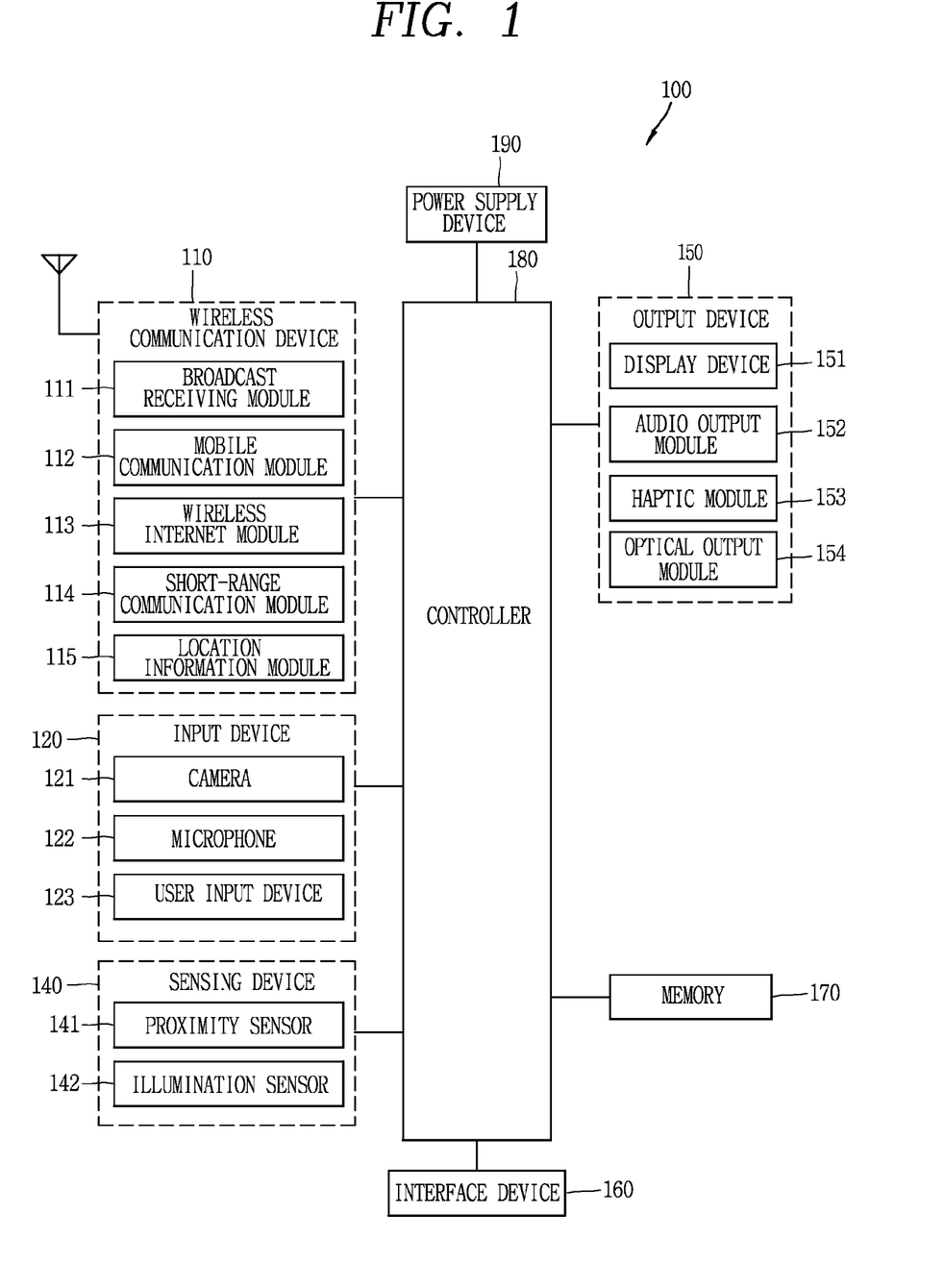
FIG. 1 is a block diagram of a mobile terminal, in accordance with embodiments as broadly described herein.

A mobile terminal 100 as shown in FIG. 1, as embodied and broadly described herein, may include a wireless communication device 110, an input device 120, a sensing device 140, an output device 150, an interface device 160, a memory 170, a controller 180, and a power supply device 190. It is understood that all of the components shown in FIG. 1 are not necessarily required, and that greater or fewer components may alternatively be implemented.

The wireless communication device 110 may include one or more modules which permit communications such as wireless communications between the mobile terminal 100 and a wireless communication system, communications between the mobile terminal 100 and another mobile terminal, communications between the mobile terminal 100 and an external server. Further, the wireless communication device 110 typically includes one or more modules which connect the mobile terminal 100 to one or more networks.

To facilitate such communications, the wireless communication device 110 includes one or more of a broadcast receiving module 111, a mobile communication module 112, a wireless Internet module 113, a short-range communication module 114, and a location information module 115.

The input device 120 includes a camera 121 for obtaining images or video, a microphone 122, which is one type of audio input device for inputting an audio signal, and a user input device 123 (for example, a touch key, a push key, a mechanical key, a soft key, and the like) for allowing a user to input information. Data (for example, audio, video, image, and the like) is obtained by the input device 120 and may be analyzed and processed by controller 180 according to device parameters, user commands, and combinations thereof.

The sensing device 140 may include one or more sensors configured to sense internal information of the mobile terminal, the surrounding environment of the mobile terminal, user information, and the like. For example, the sensing device 140 is shown having a proximity sensor 141 and an illumination sensor 142. If desired, the sensing device 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from the sensing device 140, and in particular, information obtained from one or more sensors of the sensing device 140, and combinations thereof.

The output device 150 may output various types of information, such as audio, video, tactile output, and the like. The output device 150 is shown having a display device 151, an audio output module 152, a haptic module 153, and an optical output module 154.

The display device 151 may have an inter-layered structure or an integrated structure with a touch sensor in order to facilitate a touch screen. The touch screen may provide an output interface between the mobile terminal 100 and a user, as well as function as the user input device 123 which provides an input interface between the mobile terminal 100 and the user.

The interface device 160 serves as an interface with various types of external devices that may be coupled to the mobile terminal 100. The interface device 160, for example, may include one or more of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface device 160.

The memory 170 may store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 may control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170. As one example, the controller 180 controls some or all of the components illustrated in FIG. 1 according to the execution of an application program stored in the memory 170.

The power supply device 190 may receive external power or provide internal power in order to supply appropriate power required for operating elements and components included in the mobile terminal 100 under control of the controller 180. The power supply device 190 may include a battery, and the battery may be embedded in the terminal body, or may be detachable from the terminal body.

The controller 180 may control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
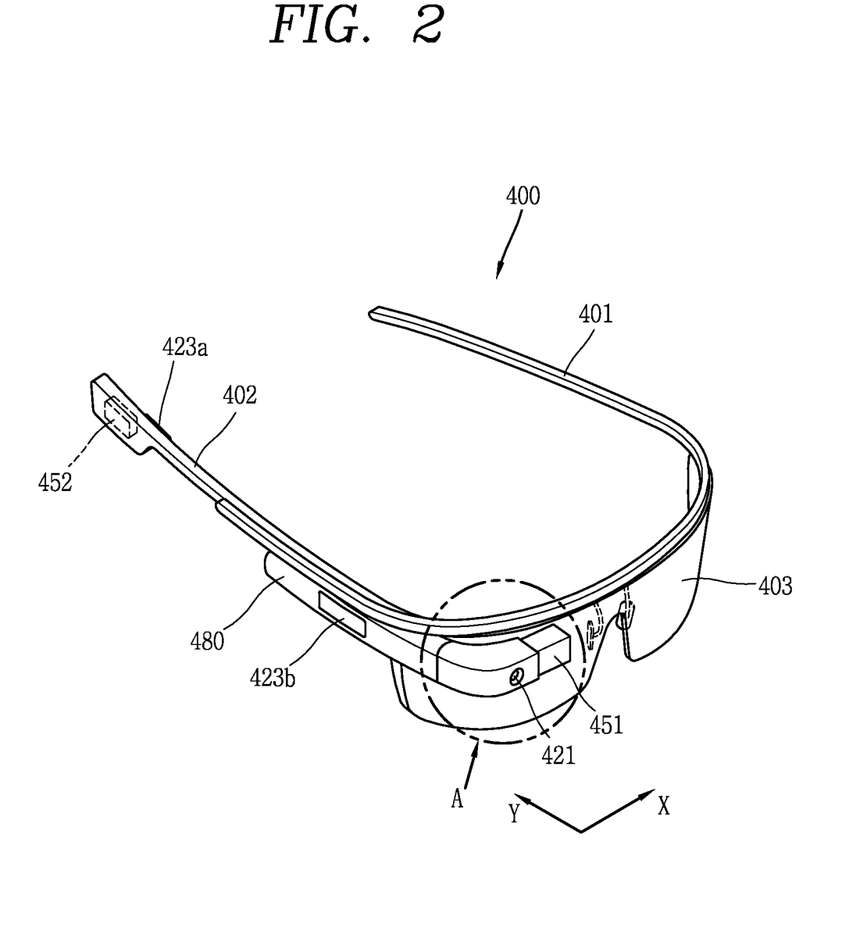
FIG. 2 is a perspective view of an exemplary a glass-type mobile terminal, according to an embodiment as broadly described herein.

FIG. 2 is a perspective view illustrating one example of a glass-type mobile terminal 400 according to another exemplary embodiment. The glass-type mobile terminal 400 may be wearable, for example, on a head of a human body and provided with a frame (case, housing, etc.) therefor. The frame may be made of a flexible material to be easily worn.

The frame of mobile terminal 400 may include a first frame 401 and a second frame 402, which may be made of the same or different materials.

The frame may be supported on the head and define a space for mounting various components. As illustrated, electronic components, such as a control module 480, an audio output module 452, and the like, may be mounted to the frame. Also, a lens 403 for covering either or both of the left and right eyes may be detachably coupled to the frame.

The control module 480 controls various electronic components disposed in the mobile terminal 400. The control module 480 may be, for example, a component corresponding to the aforementioned controller 180. FIG. 2 illustrates that the control module 480 is installed in the frame on one side of the head, but other locations may also be appropriate.

The display device 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display device 451 may be located to correspond to either or both of the left and right eyes. FIG. 2 illustrates that the display device 451 is located on a portion corresponding to the right eye to output an image viewable by the user's right eye.

The display device 451 may project an image into the user's eye using a prism. The prism may be formed from optically transparent material such that the user may view both the projected image and a general visual field (a range that the user views through the eyes) in front of the user.

In such a manner, the image output through the display device 451 may be viewed while overlapping with the general visual field. The mobile terminal 400 may provide an augmented reality (AR) by overlaying a virtual image on a realistic image or background using the display device 451.

The camera 421 may be located adjacent to either or both of the left and right eyes to capture an image. Since the camera 421 is located adjacent to the eye, the camera 421 may acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input devices 423a and 423b, which may each be manipulated by the user to provide an input. The user input devices 423a and 423b may employ techniques which permit input via a tactile input. Typical tactile inputs include a touch, push, or the like. The user input devices 423a and 423b are shown operable in a pushing manner and a touching manner as they are located on the frame and the control module 480, respectively.

If desired, mobile terminal 400 may include a microphone which processes sound input into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Figure 3:
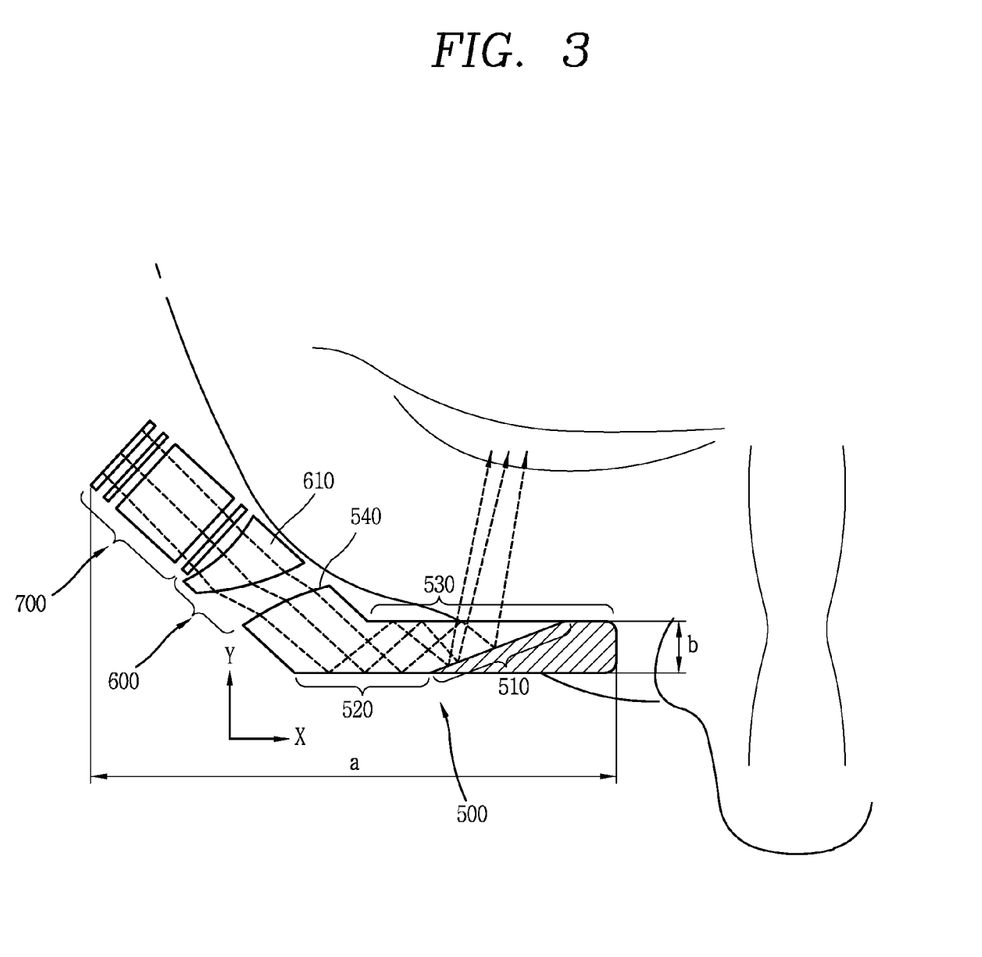
FIG. 3 is a conceptual view of an optical system of the mobile terminal shown in FIG. 2, in accordance with an embodiment as broadly described herein.

FIG. 3 is a conceptual view illustrating an optical system of the mobile terminal of FIG. 2.

Referring to FIG. 3, the optical system of the mobile terminal includes a prism 500, a lens device 600, and an optical source device 700.

The prism 500 is arranged in front of a user, and may be aligned with, for example, an eye of the user and extend in a lateral direction (X-axis direction). A mirror 510 is formed at one end of the prism 500, and an incidence portion is formed at another end of the prism 500. As shown, the incidence portion may form a prescribed inclination angle with respect to the lateral direction (X-axis direction). An incident surface 540 is formed at one end of the incidence portion.

The prism 500 is formed of a transparent material, and light incident on the prism 500 propagates in the prism 500 by Snell's law. That is, the prism 500 is formed so that a refractive index thereof may be greater than that of an external medium of the prism 500. If an incidence angle exceeds a preset value, light is totally reflected to propagate in the prism 500. That is, the prism 500 according to an embodiment may be a see-through prism which reflects light incident thereon, without mirrors coated on front and rear surfaces thereof. The see-through prism is configured to totally-reflect light incident therein when an incidence angle is more than a preset value, but is configured to transmit light therethrough when an incidence angle is less than a preset value. When so configured, light irradiated from the front side is introduced into a user's eyes through the prism 500. Light, irradiated by an optical source device 700, is totally-reflected in the prism 500 to thus be introduced into a user's eyes. Accordingly, the user may simultaneously view an object positioned in front of him or her, and an image formed on a micro display 720 of the optical source device 700 (see FIG. 7).

The mirror portion 510 may include a half mirror configured to partially transmit and reflect light incident thereon. The half mirror is formed of a transparent material or a semi-transparent material. Light, which has been incident on the mirror 510 through a total-reflective region of the prism 500, is reflected to the half mirror to thus be incident on a user's eyes.

The lens portion 600 may employ one asymmetric lens 610. That is, in an optical system, a lens may be used to obtain a desired angle of view and a desired image size. For compensation of aberration, a plurality of lenses may be used.

In an embodiment as broadly described herein, the single asymmetric lens 610 may implement two lenses. That is, different lenses are formed on front and rear surfaces of the asymmetric lens 610. More specifically, the asymmetric lens 610 may be formed so that one of an incident surface or an exit surface implements a convex lens, and the other of the incident surface or the exit surface implements a concave lens. The convex lens and the concave lens may have different sizes. That is, the incident surface and the exit surface may have different curvatures. A chromatic aberration may be controlled by controlling a size and a curvature of a lens.

The asymmetric lens 610 may be formed so that an optical axis of the incident surface and an optical axis of the exit surface may be oriented toward different directions. With the optical axis of the incident surface and the optical axis of the exit surface oriented toward different directions, an optical path of light incident on the asymmetric lens 610 may be changed.

In certain embodiments, the asymmetric lens 610 may reflect light incident thereon toward the incident surface 540 of the prism 500.

In order to reduce the thickness of the prism 500, light may be incident on the prism 500 at an inclination angle with respect to the lateral direction. For this, light may be collected in a direction toward the inside (X-axis direction). Under a structure of the asymmetric lens 610, an incidence angle of light may be controlled, and a module size may be reduced. A glass-type mobile terminal may implement a curved design through a method for refracting light using a single lens. A structure of the prism 500 and the asymmetric lens 610 will be explained in more detail with reference to FIGS. 4A to 5.

The optical source device 700 may include an optical source 710, a micro display 720, first and second lenses 730 and 740, and a beam splitting prism 750. Referring to FIG. 3, the optical source 710 may irradiate light onto a rear surface of the asymmetric lens 610. That is, in this embodiment, light irradiated from the optical source 710 is irradiated onto the asymmetric lens 610 without changing its optical path. In this embodiment, an entire length (a) of the optical source device 700 may be within the range of about 50 mm~60 mm.

In an arrangement in which light is incident on a prism from a lateral direction, the prism would have a thickness equal than or equal to that of an optical source (or micro display). However, in an arrangement as embodied and broadly described herein, light irradiated from the optical source device 700 is incident on the prism 500 with an inclination angle. Accordingly, a thickness (b) of the prism 500 may be less than a width of the optical source 710. In a typical arrangement, the prism 500 is formed to have a thickness of about 10 mm, and the thickness of the prism 500 cannot be reduced because mirror type lenses are arranged on side surfaces of the prism 500. On the contrary, in this embodiment, the prism 500 may have a thickness of about 5 mm~6 mm.

As shown, the mirror 510 has a shape that is inclined from one end of a first total-reflection portion 520 in a thickness direction (Y-axis direction) of the prism 500. The mirror 510 may connect the first total-reflection portion 520 to a second total-reflection portion 530. For compensation of aberration, a convex lens or a concave lens may be formed on the incident surface 540. A lens of the incident surface 540 may compensate aberration, in correspondence to a lens on a surface of the asymmetric lens 610.

Figure 4A:
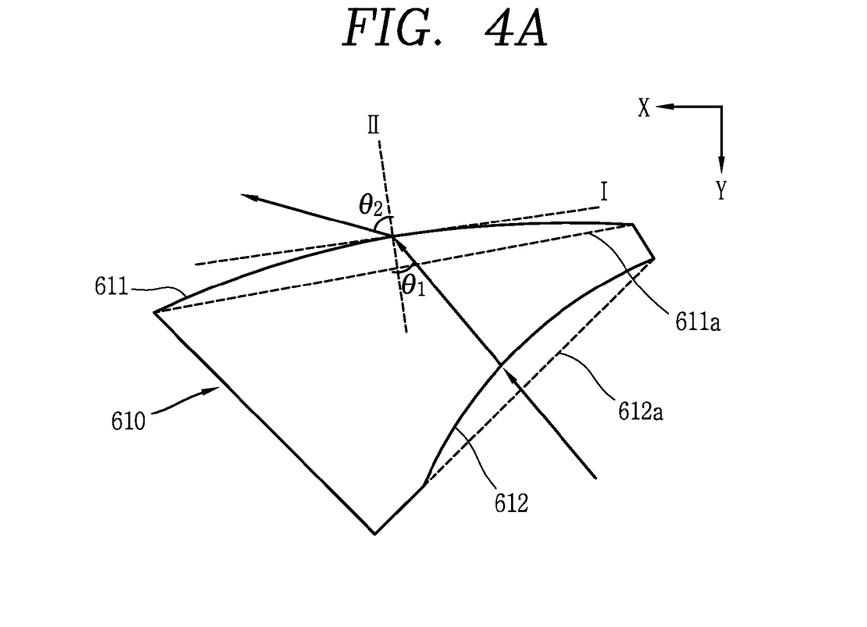
FIG. 4A illustrates an embodiment of an asymmetric lens of the optical system shown in FIG. 3.
Figure 4B:
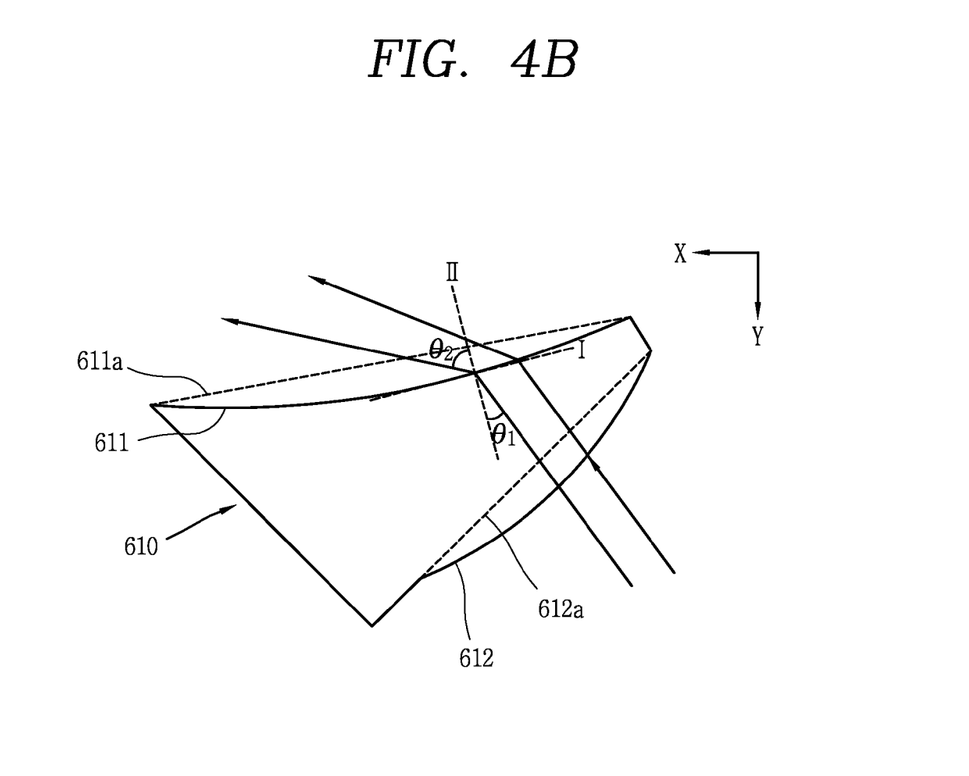
FIG. 4B illustrates another embodiment of the asymmetric lens of the optical system shown in FIG. 3.

FIG. 4A is a view illustrating an embodiment of the asymmetric lens 610 of FIG. 3, and FIG. 4B is a view illustrating another embodiment of the asymmetric lens 610 of FIG. 3.

Referring to FIG. 4A, the asymmetric lens 610 according to an embodiment may include a concave lens on an incident surface, and a convex lens on an exit surface.

Hereinafter, planar surfaces of the asymmetric lens 610, where no lenses are formed, are referred to as a first surface 612a and a second surface 611a. Each of the first surface 612a and the second surface 611a is formed with an inclination angle. That is, an optical axis of the first surface 612a and an optical axis of the second surface 611a are oriented in different directions. For instance, an angle between the optical axis of the first surface 612a and the X-axis may be less than an angle between the optical axis of the second surface 611a and the X-axis. When so configured, light incident on the asymmetric lens 610 is refracted to inside (X-axis direction).

A concave lens 612 is formed on the first surface 612a, and a convex lens 611 is formed on the second surface 611 a. For compensation of aberration, different types of lenses may be provided on the different surfaces. However, in case of using the incident surface 540 of the prism 500 as a lens, different types of lenses are not necessarily formed on a surface of the asymmetric lens 610. That is, an aberration and a focal point in an optical system may be controlled by combining a lens of the first surface 612a, a lens of the second surface 611 a, and a lens of the incident surface 540. When so configured, an optical path, an aberration and a focal point in an optical system may be controlled using the prism 500 and the single asymmetric lens 610.

In FIG. 4A, an optical path is indicated by arrows. Light emitted from a convex lens is refracted to inside (X-axis direction) by Snell's law. FIG. 4A illustrates a line 'I', the incident surface 540 of the convex lens, and a line 'II' perpendicular to the line 'I'. Since a refractive index of the asymmetric lens 610 is higher than that of an external medium, a refraction angle (θ2) is larger than an incidence angle (θ1), and light is refracted to inside (X-axis direction).

Referring to FIG. 4B, the asymmetric lens 610 according to another embodiment may include a convex lens 612 on a first surface 612a, and a concave lens 611 on a second surface 611a. For compensation of aberration, different types of lenses may be provided on the different surfaces.

Light emitted from the concave lens 611 is scattered, and may be collected through the convex lens 612 formed on the incident surface 540 of the prism 500. That is, an aberration and a focal point in an optical system may be controlled by combining a lens of the first surface 612a, a lens of the second surface 611a, and a lens of the incident surface 540. When so configured, an optical path, an aberration and a focal point in an optical system may be controlled by using the prism 500 and the single asymmetric lens 610.

In FIG. 4B, an optical path is indicated by arrows. Light emitted through a concave lens is refracted to inside (X-axis direction) by Snell's law. Like in FIG. 4A, since a refractive index of the asymmetric lens 610 is higher than that of an external medium, a refraction angle (θ2) is larger than an incidence angle (θ1), and light is refracted to inside (X-axis direction).

Referring to FIGS. 4A and 4B, light propagates in the form of a curved line toward inside (X-axis direction). Accordingly, a glass-type mobile terminal having curved edges like the optical path may be implemented.

Figure 5:
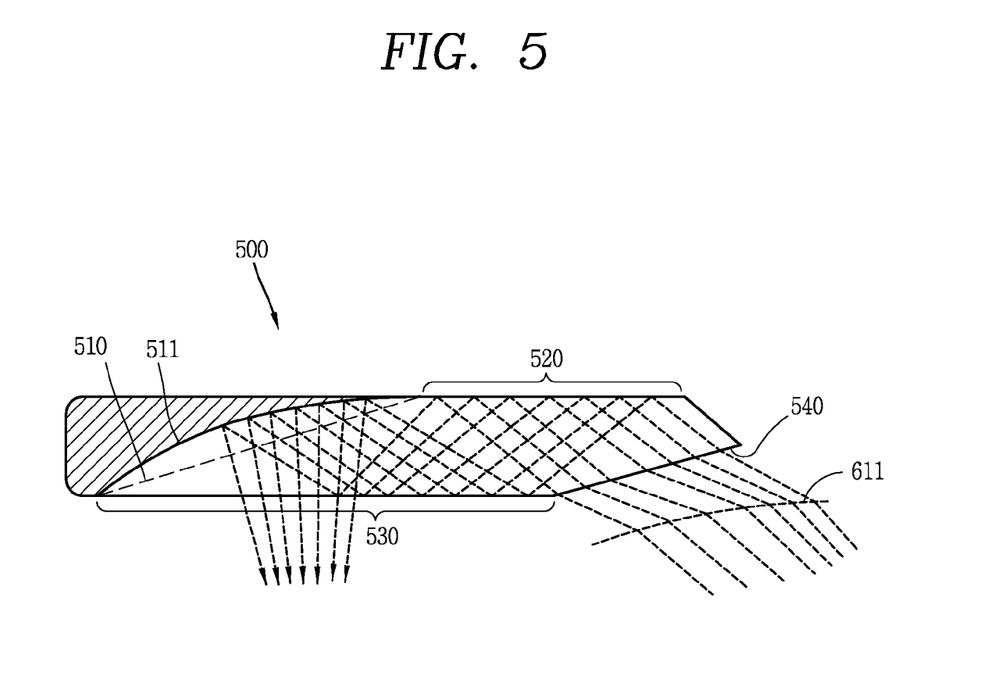
FIG. 5 is an enlarged view of a prism of the optical system shown in FIG. 3.

FIG. 5 is an enlarged conceptual view of the prism 500 of FIG. 3.

Referring to FIG. 5, the prism 500 includes a first total-reflection portion 520, a second total-reflection portion 530, a mirror 510, and an incident surface 540.

The incident surface 540 is formed to have an inclination angle in a length direction (X-axis direction) of the prism 500, thereby facing the second surface 611a of the asymmetric lens 610. The incident surface 540 may be curved. The incident surface 540 may implement a concave lens or a convex lens. A type of a lens to be formed on the incident surface 540 is determined according to a structure of the asymmetric lens 610. That is, the asymmetric lens 610 and a lens of the incident surface 540 match each other, for compensation of aberration in an optical system.

The first total-reflection portion 520 and the second total-reflection portion 530 may be transparent so as to be visible from outside of the prism 500.

The mirror 510 may reflect light passing through the first total-reflection portion 520 and the second total-reflection portion 530, toward a user. The mirror 510 is inclined from one end of the first total-reflection portion 520, in a thickness direction of the prism 500. The mirror 510 may be a half mirror for reflecting part of incident light. The mirror 510 may be transparent when viewed from the front side.

According to another embodiment, the mirror 510 may have a curved surface 511. The mirror 510 is configured to control an image size and an angle of view by forming a concave mirror, and is configured to collect light to a user's eyes. When so configured, the optical system may have a more simplified structure, and the mobile terminal may have a lighter weight and a smaller size, than in a case where a convex lens is additionally used.

Figure 6:
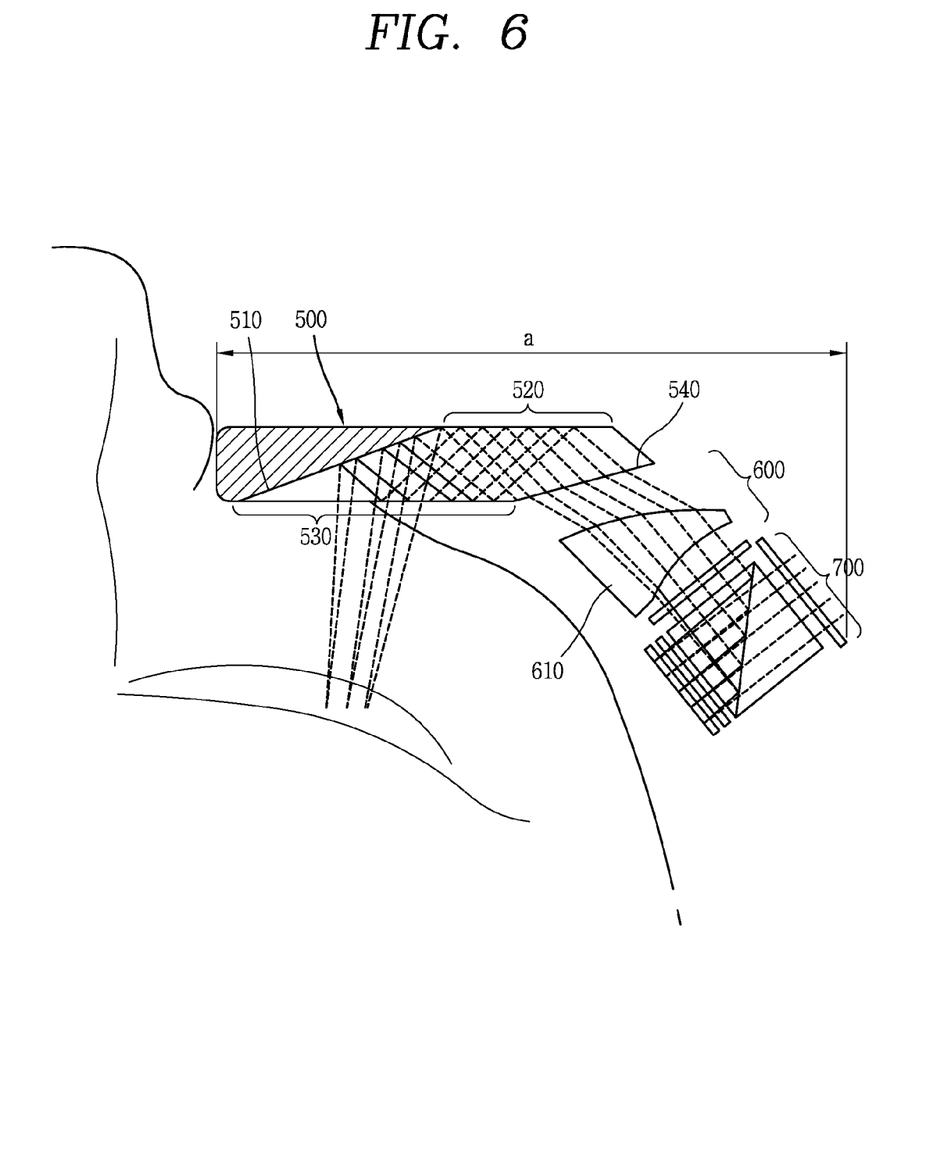
FIG. 6 is a conceptual view of an optical system of a mobile terminal, according to another embodiment as broadly described herein.

FIG. 6 is a conceptual view illustrating an optical system of a mobile terminal according to another embodiment as broadly described herein.

In this embodiment, an optical source 710 irradiates light in a direction perpendicular to an asymmetric lens 610. That is, an optical source device 700 and the asymmetric lens 610 are not aligned in a line, but are arranged to cross each other. When arranged in this manner, an entire length (a) of an optical system may be reduced, and thus a frame of a mobile terminal may have a curved surface similar to a user's facial outline.

Referring to FIG. 6, a prism 500 is arranged in front of a user, and is formed to have a relatively long length in a lateral direction (X-axis direction). A mirror 510 is formed at one end of the prism 500, and an incidence portion is formed at another end of the prism 500. As shown, the incidence portion is formed to have an inclination angle with respect to the lateral direction (X-axis direction). An incident surface 540 is formed at one end of the incidence portion.

In order to reduce the thickness of the prism 500, light may be incident on the prism 500 with an inclination angle with respect to the lateral direction. For this, light may be collected toward inside (X-axis direction). Under a structure of the asymmetric lens 610, an incidence angle of light may be controlled and a module size may be reduced.

In this embodiment, light irradiated from the optical source 710 is not directly irradiated onto the asymmetric lens 610. Rather, light, which has been irradiated from the optical source 710 in a direction perpendicular to the asymmetric lens 610, is incident on the asymmetric lens 610 through a beam splitting prism 750. That is, the optical source device 700 and the asymmetric lens 610 are not arranged in a line. In this embodiment, the entire length (a) of the optical system is formed within the range of about 45 mm~46 mm. In this case, the entire length (a) of the optical system may be reduced more than that of the arrangement shown in FIG. 3 by 10 mm or more.

Figure 7:
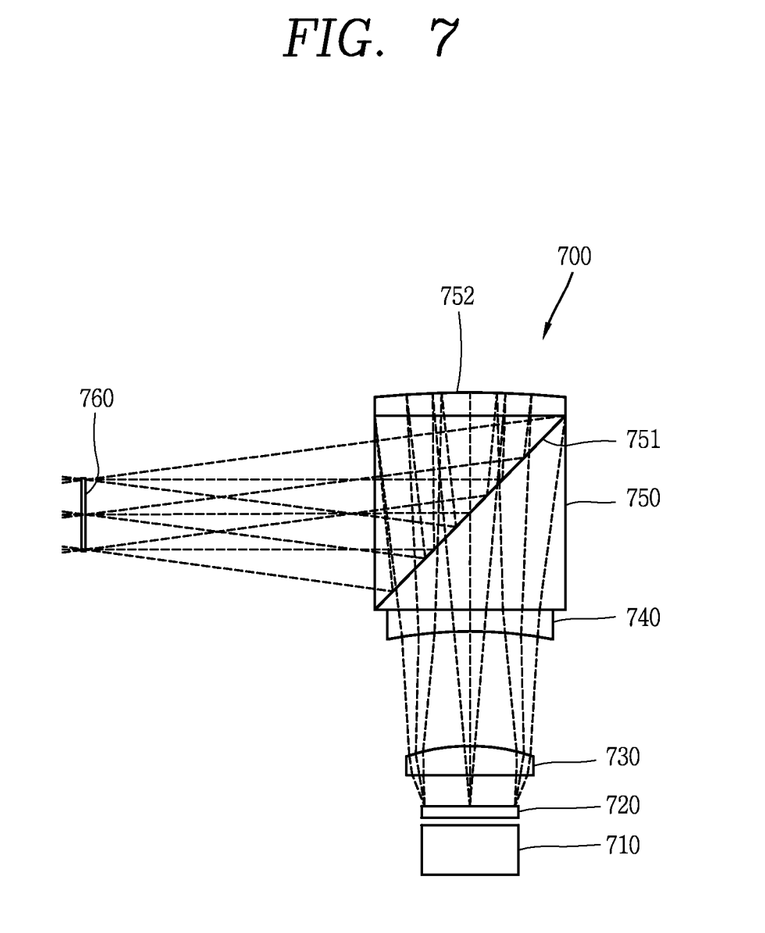
FIG. 7 illustrates an embodiment of an optical source unit of the optical system shown in FIG. 6.

FIG. 7 is a conceptual view of the optical source device 700 of FIG. 6.

Referring to FIG. 7, the optical source device 700 may include an optical source 710, a micro display 720, a first lens 730, a second lens 740, a beam splitting prism 750, and a third lens 760.

The optical source 710 may include an assembly of light emitting diodes (LEDs) including red light, green light and blue light. The optical source 710 forms an image on the micro display 720 by irradiating light onto the micro display 720.

The micro display 720 may be a see-through type micro display 720, or a reflective type micro display 720.

The micro display 720 forms an image in response to an electric signal applied thereto. The electric signal may be provided under control of the controller inside the mobile terminal. An image formed on the micro display 720 is transmitted to the asymmetric lens 610 via the first lens 730, the second lens 740, the beam splitting prism 750, and the third lens 760.

Light from the micro display 720 is linearly-polarized to thus be incident on the beam splitting prism 750 through the first lens 730 and the second lens 740. The first lens 730 and the second lens 740 are combined with each other so that a lateral chromatic aberration may be removed. Light incident on the beam splitting prism 750 is reflected to a plate 752, and a polarizing direction thereof is rotated by 90°. Then the light is reflected by a polarizing surface 751, and propagates in a direction perpendicular to an incidence direction.

The third lens 760 may be arranged on the optical path. The third lens 760 may be a collimating lens so that light incident on the asymmetric lens 610 may form parallel rays.

Figure 8:
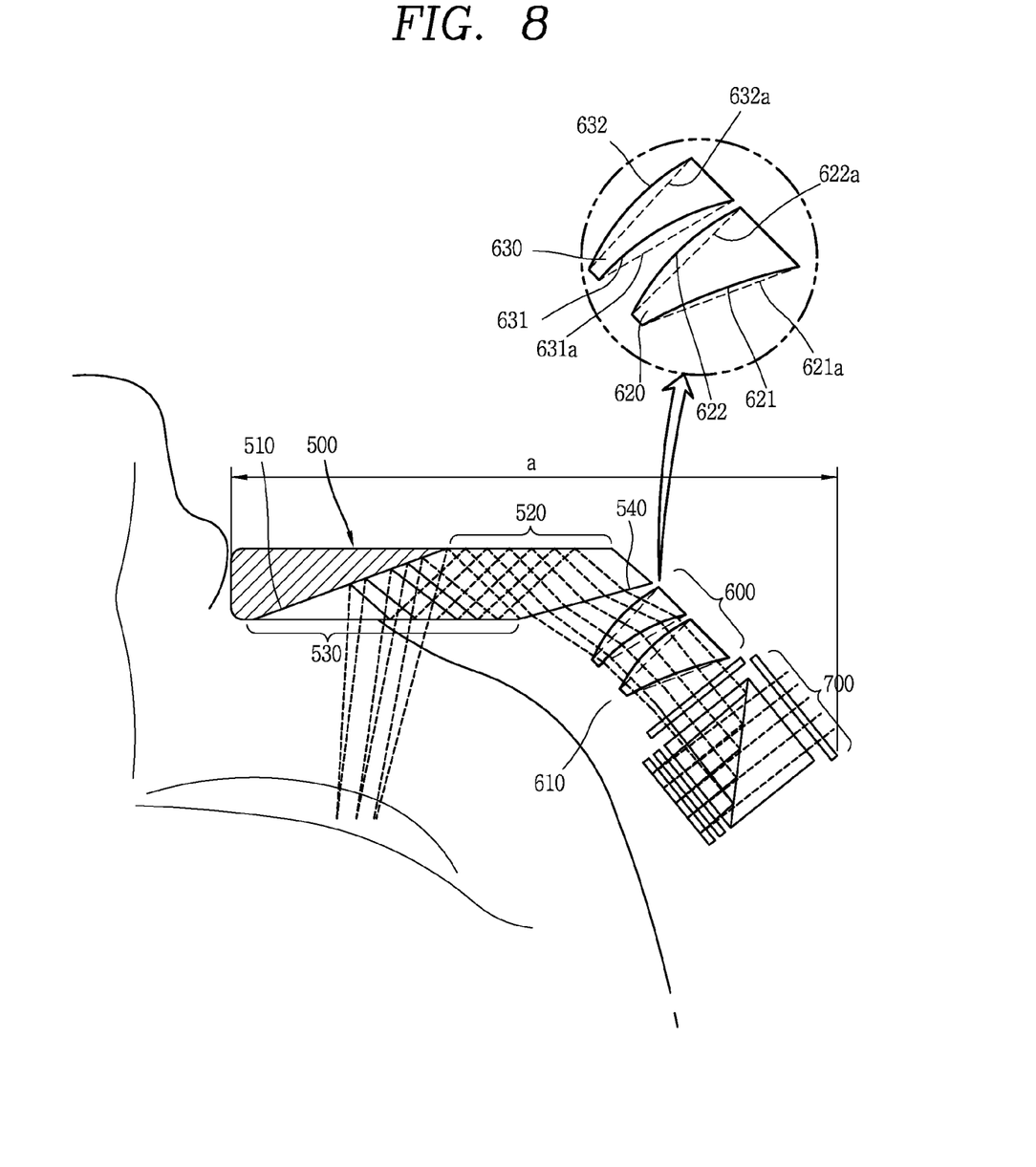
FIG. 8 illustrates an optical system of a mobile terminal, according to still another embodiment as broadly described herein.

FIG. 8 illustrates an optical system of a mobile terminal according to still another embodiment as broadly described herein.

Referring to FIG. 8, an asymmetric lens 610 may include a first asymmetric lens 620, and a second asymmetric lens 630 overlapped with the first asymmetric lens 620 in a propagation direction of light.

The first asymmetric lens 620 include a concave lens 621 on an incident surface 621a, and a convex lens 622 on an exit surface 622a. Likewise, the second asymmetric lens 630 may include a concave lens 631 on an incident surface 631a, and a convex lens 632 on an exit surface 632a. As the two asymmetric lenses 620 and 630 are combined with each other, an optical path may be easily changed.

An optical axis of the first asymmetric lens 620 and an optical axis of the second asymmetric lens 630 may be oriented in different directions. When arranged in this manner, light incident on the asymmetric lens 610 is refracted to inside (X-axis direction). The optical system may have enhanced performance by controlling a chromatic aberration of the first asymmetric lens 620 and the second asymmetric lens 620.

An optical source 710 irradiates light in a direction perpendicular to an asymmetric lens 610. That is, an optical source device 700 and the asymmetric lens 610 are not aligned in a line, but are arranged to cross each other. When arranged in this manner, an entire length (a) of an optical system may be reduced, and thus a frame of a mobile terminal may have a curved surface similar to a user's facial outline.

In a wearable type mobile terminal, as embodied and broadly described herein, as an image is transmitted to a user via the see-through prism 500, an additional mirror is not necessarily also attached to the prism 500 for transmission of light. This may simplify fabrication processes, and may reduce fabrication costs.

In a wearable type mobile terminal, as embodied and broadly described herein, a complicated lens assembly for changing an optical path is not necessary, because light may be incident on the prism 500 with an inclination angle by using the asymmetric lens 610. This may allow a lighter and slimmer glass-type mobile terminal to be implemented.

A wearable type mobile terminal is provided, implementing a slim configuration by controlling an optical path using a new type of lens and prism.

A glass-type mobile terminal is provided, implementing an optical system applied to a frame having a curved shape.

A wearable type mobile terminal, as embodied and broadly described herein, may include a prism disposed in front of a user, and formed to have a long length in a lateral direction; an optical source unit configured to irradiate light to the prism in a direction inclined from the lateral direction by a prescribed angle; and an asymmetric lens disposed between the prism and the optical source unit such that light irradiated from the optical source unit is collected toward the prism, and the asymmetric lens formed such that an optical axis of an incident surface and an optical axis of an exit surface are toward different directions.

In certain embodiments, one of the incident surface or the exit surface of the asymmetric lens may implement a convex lens, and the other may implement a concave lens.

In certain embodiments, the asymmetric lens may be formed such that the incident surface and the exit surface thereof have different curvatures.

In certain embodiments, an optical axis of the exit surface may be formed to be more inclined than an optical axis of the incident surface, in a thickness direction of the prism.

In certain embodiments, the wearable type mobile terminal may include another asymmetric lens disposed so as overlap the asymmetric lens along an optical path.

In certain embodiments, the prism may include an incident surface at one side thereof, the incident surface having a prescribed inclination angle with respect to the lateral direction.

In certain embodiments, the incident surface may have a curved surface.

In certain embodiments, the incident surface may implement a concave lens.

In certain embodiments, the incident surface may implement a convex lens.

In certain embodiments, the prism may be a see-through prism configured to totally-reflect incident light.

In certain embodiments, the prism may include a reflective surface at another side thereof, the reflective surface inclined toward a user in the lateral direction.

In certain embodiments, the reflective surface may include a half mirror configured to partially transmit and reflect light incident thereon.

In certain embodiments, the half mirror may have a curved surface.

In certain embodiments, the half mirror may have a shape of a concave mirror, such that light which has passed through the prism is collected.

A wearable type mobile terminal, in accordance with another embodiment as broadly described herein, may include a glass disposed in front of a user's eyes; a frame unit extending from one end of the glass in the form of a curved surface; a prism configured to form at least part of the glass; an optical source unit disposed in the frame unit, and configured to irradiate light to the prism; and an asymmetric lens disposed between the optical source unit and the prism so as to guide light irradiated from the optical source unit to the prism, and the asymmetric lens formed such that an optical axis of an incident surface and an optical axis of an exit surface are toward different directions.

In certain embodiments, the asymmetric lens may be configured to refract light such that the light propagates along the curved surface.

In certain embodiments, one of the incident surface of the exit surface of the asymmetric lens may implement a convex lens, and the other may implement a concave lens.

In certain embodiments, an incident surface of the prism may have a curved surface.

In certain embodiments, the optical source unit may include an optical source configured to irradiate light to the asymmetric lens; and a beam splitting prism disposed between the optical source and the asymmetric lens.

In certain embodiments, the optical source may be arranged in a direction perpendicular to an extending direction of the frame unit, and the beam splitting prism may be configured to reflect light irradiated from the optical source, toward the asymmetric lens.

In a wearable mobile terminal, in accordance with embodiments as broadly described herein, as an image is transmitted to a user via the see-through prism, an additional mirror is not necessarily attached to the prism for transmission of light, which may simplify fabrication processes, and may reduce fabrication costs.

In a wearable mobile terminal, in accordance with embodiments as broadly described herein, a complicated lens assembly for changing an optical path is not necessary, because light may be incident on the prism at an inclination angle due to use of the asymmetric lens, providing for a lighter and slimmer glass-type mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wearable type mobile terminal device, comprising:
   a frame;
   a glass coupled to the frame, the frame and glass being contoured so as to be wearable within a field of vision of a user;
   a prism extending in a lateral direction along the glass;
   an optical source device configured to irradiate light to the prism in a direction that is inclined with respect to the lateral direction by a prescribed angle; and
   an asymmetric lens disposed between the prism and the optical source device such that light irradiated by the optical source device is directed toward the prism, wherein an optical axis of an incident surface of the asymmetric lens and an optical axis of an exit surface of the asymmetric lens are oriented in different directions, wherein the prism includes;
   a first total-reflection portion totally reflecting light from the asymmetric lens;
   a second total-reflection portion totally reflecting light from the first total-reflection portion, formed in parallel with the first total-reflection portion; and
   a mirror reflecting light having been reflected by the first total-reflection portion and the second total-reflection portion, the mirror being inclined from one end of the first total-reflection portion in a thickness direction of the prism so as to connect the first total-reflection portion to the second total-reflection portion.

2. The device of claim 1, wherein one of the incident surface of the exit surface of the asymmetric lens includes a convex lens, and the other of the incident surface or the exit surface of the asymmetric lens includes a concave lens.

3. The device of claim 2, wherein a curvature of the incident surface and a curvature of the exit surface of the asymmetric lens are different.

4. The device of claim 2, wherein an inclination of the optical axis of the exit surface is greater than an inclination of the optical axis of the incident surface, in a thickness direction of the prism.

5. The device of claim 2, further comprising another asymmetric lens positioned so as to overlap the asymmetric lens disposed between the prism and the optical source device along an optical path.

6. The device of claim 1, wherein the prism comprises an incident surface at a first side thereof, the incident surface forming a prescribed inclination angle with respect to the lateral direction.

7. The device of claim 6, wherein a surface of the incident surface of the asymmetric lens is curved.

8. The device of claim 7, wherein the incident surface of the asymmetric lens comprises a concave lens.

9. The device of claim 7, wherein the incident surface of the asymmetric lens comprises a convex lens.

10. The device of claim 6, wherein the prism is a see-through prism configured for total reflection of incident light.

11. The device of claim 7, wherein the prism comprises a reflective surface at a second side thereof, the reflective surface being inclined in the lateral direction.

12. The device of claim 11, wherein the reflective surface includes a half mirror configured to partially transmit and reflect light incident thereon.

13. The device of claim 12, wherein a surface of the half mirror is curved.

14. The device of claim 13, wherein the half mirror is formed in a shape corresponding to a concave mirror so as to collect light which has passed through the prism.

15. A wearable type mobile terminal device, comprising:
a glass;
a frame extending from one end of the glass, the frame being configured to position the glass within a field of vision of a user;
a prism configured to form at least a part of the glass;
an optical source device coupled to the frame and configured to irradiate light to the prism; and
an asymmetric lens disposed between the optical source device and the prism so as to guide light irradiated by the optical source device to the prism, wherein an optical axis of an incident surface of the asymmetric lens and an optical axis of an exit surface of the asymmetric lens are oriented in different directions, wherein the prism includes;
a first total-reflection portion totally reflecting light from the asymmetric lens;
a second total-reflection portion totally reflecting light from the first total-reflection portion, formed in parallel with the first total-reflection portion; and
a mirror reflecting light having been reflected by the first total-reflection portion and the second total-reflection portion, the mirror being inclined from one end of the first total-reflection in a thickness direction of the prism so as to connect the first total-reflection portion to the second total-reflection portion.

16. The device of claim 15, wherein the asymmetric lens is configured to refract light such that the light propagates along a curved surface of the asymmetric lens.

17. The device of claim 16, wherein one of the incident surface or the exit surface of the asymmetric lens comprises a convex lens, and the other of the incident surface or the exit surface of the asymmetric lens comprises a concave lens.

18. The device of claim 17, wherein an incident surface of the prism is curved.

19. The device of claim 15, wherein the optical source device comprises:
an optical source configured to irradiate light to the asymmetric lens; and
a beam splitting prism disposed between the optical source and the asymmetric lens.

20. The device of claim 19, wherein the optical source is arranged in a direction perpendicular to an direction in which the frame extends, and wherein the beam splitting prism is configured to reflect light irradiated by the optical source toward the asymmetric lens.

* * * * *